(12) United States Patent
Zimmer

(10) Patent No.: US 7,093,317 B1
(45) Date of Patent: Aug. 22, 2006

(54) WINDSCREEN WIPER WITH SPRAY NOZZLE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/700,873

(22) PCT Filed: Mar. 11, 2000

(86) PCT No.: PCT/DE00/00772

§ 371 (c)(1),
(2), (4) Date: Feb. 1, 2001

(87) PCT Pub. No.: WO00/56584

PCT Pub. Date: Sep. 28, 2000

(30) Foreign Application Priority Data

Mar. 24, 1999 (DE) ................................. 199 13 193

(51) Int. Cl.
B60S 1/52 (2006.01)
B60S 1/34 (2006.01)
B60S 1/48 (2006.01)

(52) U.S. Cl. .............................. 15/250.04; 15/250.351; 239/284.1

(58) Field of Classification Search .............. 15/250.01, 15/250.02, 250.03, 250.04, 250.351; 239/284.1, 239/284.2
See application file for complete search history.

(56) References Cited

U.S. PATENT DOCUMENTS

| | | | |
|---|---|---|---|
| 3,432,876 A | 3/1969 | Edwards ................... | 239/284.1 |
| 3,913,167 A * | 10/1975 | Frigon ...................... | 15/250.04 |
| 3,940,068 A * | 2/1976 | Mohnach et al. ........ | 239/284.1 |
| 4,133,071 A * | 1/1979 | Jaske ....................... | 15/250.04 |
| 5,865,376 A | 2/1999 | Krizek ..................... | 239/284.1 |
| 5,987,695 A * | 11/1999 | Edele et al. ............. | 15/250.04 |

FOREIGN PATENT DOCUMENTS

| | | | | |
|---|---|---|---|---|
| DE | 2 155 279 | | 6/1973 | |
| DE | 36 39 537 A | | 6/1988 | |
| DE | 37 33 237 A1 | | 4/1989 | |
| DE | 3907980 | * | 9/1990 | .............. 15/250.04 |
| DE | 198 15 171 A1 | | 6/1999 | |
| DE | 44 25 493 C2 | | 3/2000 | |
| EP | 566470 | * | 10/1993 | .............. 15/250.04 |
| EP | 0 738 636 A1 | | 10/1996 | |
| FR | 2 752 800 A | | 3/1998 | |
| GB | 2 223 424 A | | 4/1990 | |

* cited by examiner

Primary Examiner—Gary K. Graham
(74) Attorney, Agent, or Firm—MIchael J. Striker

(57) ABSTRACT

A windshield wiper includes a wiper arm, which is driven via a drive shaft and to which a wiper blade is pivotably connected, in which at least one spray nozzle (10) is disposed on a pivotable part (14), the spray nozzle being composed of a plurality of parts and its housing (16) communicating disconnectably via a water line (18) to a water pump (118). In the housing (16) or in a nozzle body (12) communicating with it, a continuous water conduit (20) connected to the water line (18) is provided, from which a connecting conduit (22) branches off that leads to a spray conduit (24) that is approximately parallel to the water conduit (20) and has a nozzle opening (26), the water conduit (20) being closed on its free end (38).

17 Claims, 4 Drawing Sheets

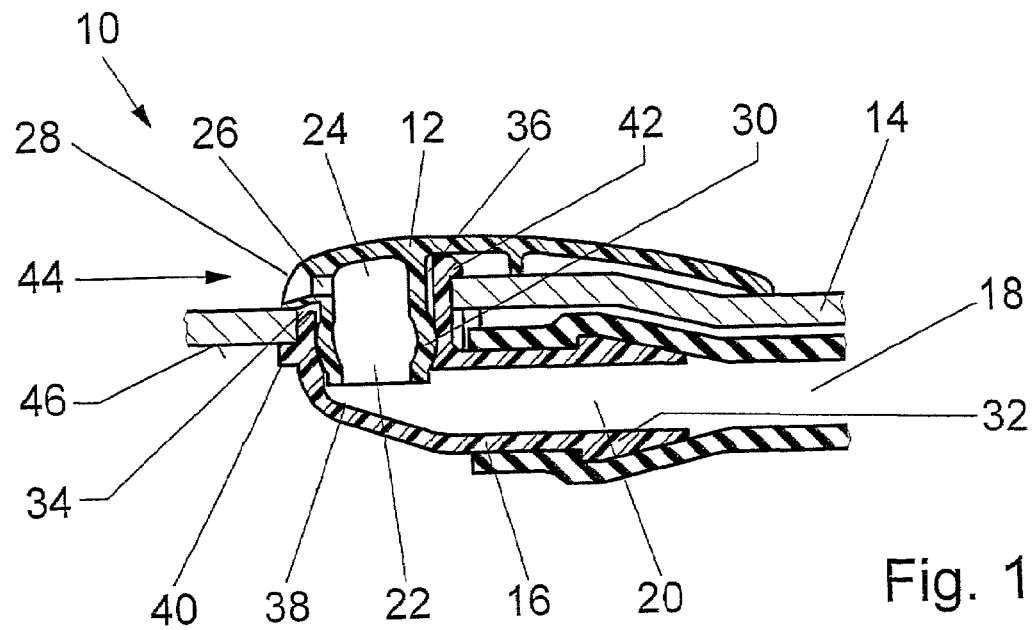
Fig. 1
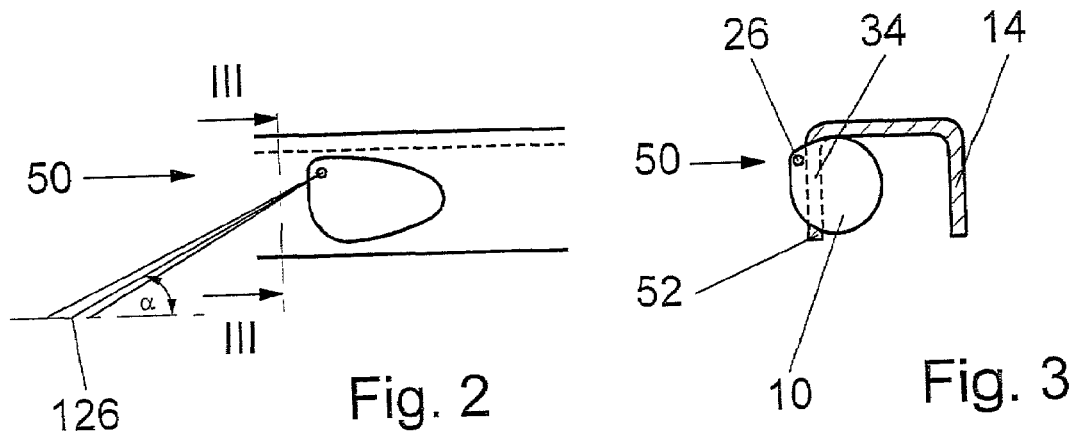
Fig. 2
Fig. 3
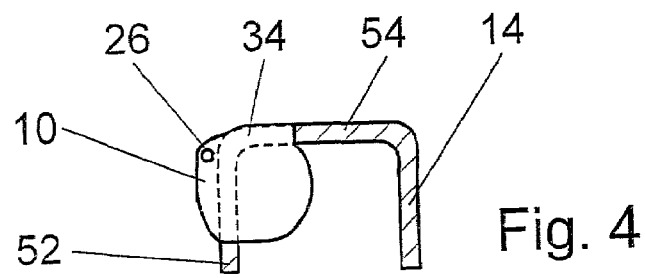
Fig. 4

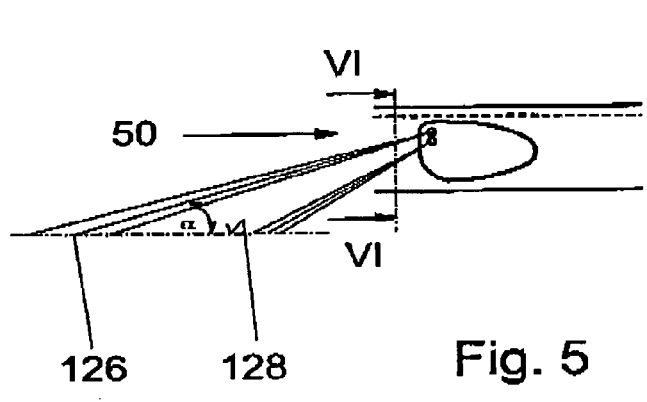
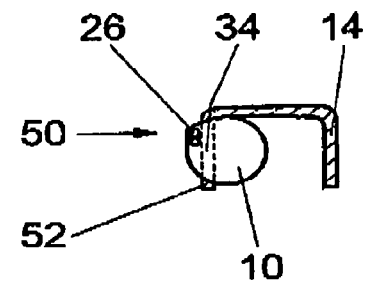
Fig. 5  Fig. 6
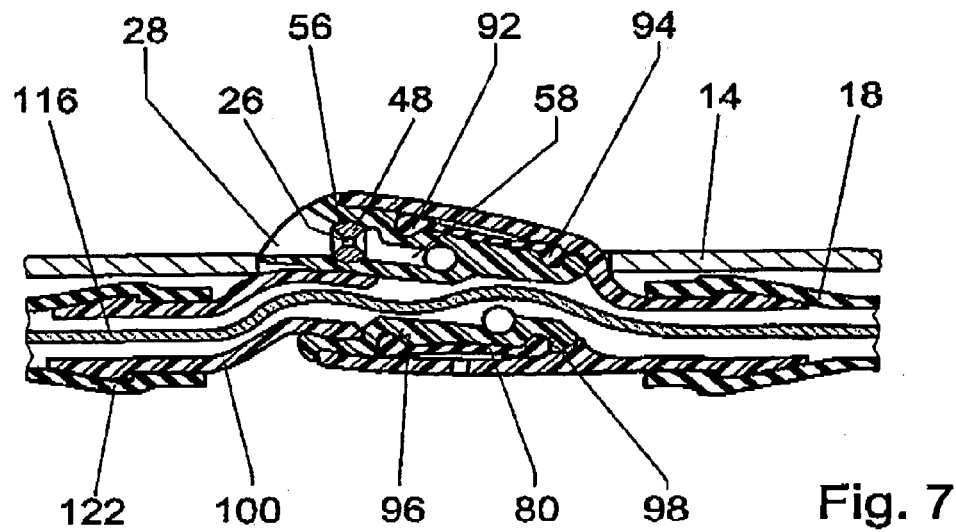
Fig. 7

WINDSCREEN WIPER WITH SPRAY NOZZLE

BACKGROUND OF THE INVENTION

The invention is relates generally to a windshield wiper having a wiper arm, which is driven via a drive shaft and to which a wiper blade is pivotably connected.

Known windshield wipers have a wiper arm, which is made up of a fastening element and a hinge element, which is pivotably connected to it via a swivel joint and has a wiper rod. A hooklike end of the wiper rod engages a suspension box of a wiper blade, which is formed by two side cheeks of a middle bracket and includes a hinge bolt. The hinge thus formed guides the wiper blade over the vehicle window during the swiveling motion. The wiper blade has what is as a rule a multi-member support bracket system, with subordinate brackets pivotably connected to the middle bracket, at least some of which subordinate brackets, with claws on their ends, retain a wiper strip by its head strip. The multi-member support bracket system and spring rails placed in the head strip make it possible during wiping for the wiper strip to adapt, with a uniform contact pressure, to a curved windshield. To that end, a tension spring prestresses the swivel joint. The wiper arm is secured with its fastening element on a drive shaft and is driven by it in the wiping motion. Such windshield wipers are known, for instance from German Patent Disclosure DE 37 44 237 A1. In simple versions, subordinate brackets, also known as intermediate brackets and claw brackets, can be dispensed with. In the simplest case, the middle bracket itself has claws, with which it retains the wiper strip.

Windshield washing systems for vehicles are as a rule used in conjunction with windshield wipers. They are actuated if the moisture from precipitation does not suffice to clean the vehicle window. They include a water container, spray nozzles, and a pump which pumps water, sometimes admixed with cleaning and antifreeze agents, under pressure out of the water container to the spray nozzles. As a rule, the spray nozzles are secured to some part of a vehicle body, such as a hood, window frame, or the like. To prevent the spray nozzles from freezing at temperatures below the freezing point, heating elements are integrated into the spray nozzles and communicate with a power supply via plugs located on the outside. The heating elements require relatively great effort and expense for producing the spray nozzles and great effort and expense for assembly for laying the electric lines and contacting the plugs. Furthermore, the highly volatile antifreeze agents rapidly evaporate, and the nozzle openings become plugged with the residues.

It is already known to secure spray nozzles as additional components on the wiper blade and thus to distribute the spraying water over the wiping region directly with a short stream length. Since the spraying water is concentrated on a region in the vicinity of the wiper blade and is wiped off again in the briefest time by the wiping motion, the view is hindered only briefly by the spraying water applied. A disadvantage of such systems is that the effects of weather, especially hail and extreme sunshine, have a major effect on the flexible parts of this arrangement, which are required for spanning the jointed regions between the wiper arm and the wiper blade. The spray nozzles and water lines that are exposed to the relative wind also freeze up quickly at temperatures below the freezing point, unless enough antifreeze is added to the water. As a rule, thawing the frozen water lines and spray nozzles again can be done only with major effort.

In an earlier German patent application, DE 198 15 171.3, a wiper arm is described, on whose hinge element, or on a wiper rod integrally joined to the hinge element, spray nozzles are disposed. These nozzles have a nozzle body, which is accommodated in a bulge of the hinge element with an opening for the spray stream, or is clipped, protruding downward, in a lateral mount on the wiper rod. It is also possible for two nozzle bodies to be provided, which are joined together by a rigid or flexible connecting piece. The nozzle bodies can be replaced easily and are well protected against environmental factors.

Expediently, the spray nozzle has an outward-opening check valve, which prevents the water line from running empty if the washer system goes unused for relatively long periods, or if water escapes during wiping operation without any washing function, especially at high wiping frequencies and/or with stroke-controlled wiper arms. Furthermore, washing water and antifreeze is prevented from evaporating in the region of the spray nozzle, especially in the case of a heated spray nozzle, and narrowing or plugging up the spray nozzle with deposits.

A heater which is passed in the form of a wire through a water supply lead and is embodied as a heating coil in the nozzle body is integrated with the wiper system. The heater fits only one type of windshield wipers, so that a large number of different heating devices must be kept in stock. Furthermore, there are simple versions in which the nozzle bodies are integrally joined together and produced as a plastic injection-molded part. By means of the nozzle bodies distributed on the wiper arm, the spraying water is well distributed over the wiper region, especially if a spray stream is aimed at a lower region directly in front of the wiper blade. Since short stream lengths result from this arrangement, even at relatively high vehicle speed the relative wind can have only little effect on the distribution of spraying water.

SUMMARY OF THE INVENTION

According to the invention, at least one spray nozzle is disposed on a retaining element. The retaining element can be a wiper arm and/or a wiper rod. The spray nozzle has a housing, which includes a water conduit from which a connecting conduit branches off. The water conduit can also be formed by a nozzle body that is inserted into the housing. From the water conduit, a connecting conduit branches off, leading to a spray conduit that is virtually parallel to the water conduit and is closed on its free end. With only a few modifications, such an arrangement makes numerous variants possible, with which the demands for various installation situations on a wiper arm can be met. The spray nozzle is constructed from a plurality of functional units that can be put together as needed.

In one feature of the invention, the housing is retained, for instance clipped, in an opening of the retaining element. A nozzle body with a stub surrounding the spray conduit is inserted from outside into the opening, protruding through the retaining element, of the connecting conduit of the housing. The outer part of the nozzle body has a nozzle opening and covers the housing and the opening of the retaining element. Hence the structural parts can be quickly joined to one another separably, and they can also easily be replaced individually. The spray nozzle protrudes out of the retaining element with only the outer part of the nozzle body, and that part fits smoothly with the contour of the retaining element, so that both visually and in terms of fluidics it is not a hindrance and it causes no noise.

For wipers with relatively long wiper blades, a plurality of spray nozzles are needed. For this purpose, a variant of the invention provides a water conduit, for those spray nozzles located toward the front in the flow direction, which on its free end has a connection piece to a water line leading onward that leads to a further spray nozzle. Instead of the connection piece, a closure cap is clipped into the last spray nozzle, and this closure cap closes the continuous water conduit. To enable good adaptation of one of the spray nozzles and the water lines to the applicable retaining elements, instead of integrally formed straight or offset-bent connection pieces, inserted connection pieces are provided, and thus the housing and/or the nozzle body is the same for various connecting parts or closure parts. The connecting water line having the spray nozzles is optimally adapted to the existing installation space by means of a suitable selection of structural parts.

The visual and fluidic effect depend essentially on the extent to which the spray nozzle protrudes out of the retaining element. It is therefore expedient for the nozzle body having the orifice of the spray conduit to protrude far enough out of an opening of a retaining element that the inner wall of the spray conduit or nozzle opening, which wall is oriented toward the retaining element, is flush with the outer wall of the retaining element. As a result, despite a shallow design, the spray stream can be aimed largely parallel to the retaining element or in other words the wiper arm. An especially shallow design is obtained if the nozzle opening is formed directly into the nozzle body or into a nozzle cap and is an integral component of the nozzle body. The nozzle cap is expediently seated disconnectably on a stub of the nozzle body. In the event of wear or damage it can easily be exchanged, or it can be replaced with a nozzle cap having a different spray stream geometry. If the nozzle cap is supported on a ball seat of the stub, then the spray stream can be adjusted even after the spray nozzle has been installed.

As a rule, the spray conduit upstream of the nozzle opening is wider than the nozzle opening itself. It is therefore expedient to place the nozzle opening on the outer edge of the spray conduit, in order to reduce the extent of protrusion of the spray nozzle from the retaining element. This is especially simple if the nozzle opening is integrated with the nozzle body or nozzle cap. In order to carry the washing water in a streamlined way to the nozzle opening, it is advantageous that the nozzle cap has a guide body, which leads to the nozzle opening and in the installed state of the nozzle cap engages the spray conduit.

According to the invention, the nozzle opening is disposed in the upper region of the retaining element; this makes the impact angle of the spray stream as steep as possible. When the impact angle is steep, the impact area varies less as a function of tolerances that can occur with regard to the direction of the stream. As a rule, one nozzle opening suffices. By means of a plurality of nozzle openings disposed vertically one above the other, the wettable impact area can be increased without having the spray nozzle protrude farther out of the retaining element.

The nozzle body of the spray nozzle is made from plastic and is clipped into the housing, so that its continuous water conduit communicates with the water line. A connecting conduit that leads to a spray conduit with a nozzle opening branches off from the water conduit. Upon pressure buildup of the pump, water is forced out of the supply tank through the lines of the system as far as the nozzle opening, whereupon it passes through the nozzle opening into the open air. In the pressureless state, some of the water continues to flow, so that the lines are partly emptied. To prevent the lines from running empty, a variant of the invention provides a check valve. A diaphragm closes the connecting conduit in the pressureless state. The diaphragm can be located close to the nozzle opening, so that only a small volume of water is stored between the diaphragm and the nozzle opening and accordingly can escape or evaporate in an uncontrolled way. The diaphragm is embodied as a rubber-elastic tubular diaphragm, which has beads on its ends. The beads are embedded in annular grooves of the nozzle body. When the water flows in through the connecting conduit, an annular chamber at the circumference of the nozzle body is filled, and the diaphragm is spread open. In the process, the diaphragm is braced on the outside on the housing and uncovers the discharge openings of the connecting conduit and of the spray conduit at the circumference of the nozzle body. In order that only the ambient pressure and the prestressing of the diaphragm will have to be overcome for opening purposes, a ventilation bore is located on the nozzle housing. The opening pressure of the diaphragm is slight, and thus the system can be operated at a relatively small pump capacity.

The nozzle body can easily be made from plastic by injection molding. Its outer diameter decreases between the annular grooves on both ends, so that the tubular diaphragm on its ends is retained sealingly between the housing and the nozzle body, but in the region of the annular chamber at the circumference of the nozzle body has sufficient radial clearance that it can uncover large enough flow cross sections. The smooth outer cylindrical or conical contour is thus preserved.

To make the spray nozzles capable of winter operation as well, they are heated. The heating line advantageously leads through the entire water line and through the water conduits. The diaphragm valves close off the water chamber from outside and thus prevent the heated from evaporating and calcifying the spray nozzles. With the aid of the diaphragm valves, the water is also trapped in the system during periods of nonuse. Thus in pulsed spraying, the washing water can be sprayed at the right moment in front of the wiper blade. In order not to hinder the view of the driver, the water sprays during the upward motion of the wiper arms, but in downward wiping no water can dribble after it.

A smaller structural volume of the communicating spray nozzles is obtained by providing that the water and energy supply are integrated in one element, so that there is no need for electrical contacting of the heating and the nozzles. Good energy transmission is attained, since there is only a slight spacing between the water conduit and the nozzle opening. Making the nozzle body from plastic provides thermal insulation from the outside, so that the heat output is concentrated especially on the nozzle opening and the water. This leads to a lower energy consumption.

The heated water improves the cleaning action, so that not only water consumption but especially the consumption of polluting additives can be reduced.

BRIEF DESCRIPTION OF THE DRAWINGS

Further advantages will become apparent from the ensuing description of the drawing. In the drawing, exemplary embodiments of the invention are shown. The drawing, description and claims include numerous characteristics in combination. One skilled in the art will expediently consider the characteristics individually as well and put them together to make useful further combinations.

Shown are:

FIG. 1, a longitudinal section through a spray nozzle;

FIG. 2, a schematic elevation of a disposition of a spray nozzle on a retaining element;

FIG. 3, a section taken along the line III—III of FIG. 2;

FIG. 4, a variant of FIG. 3;

FIG. 5, a variant of FIG. 2, with two nozzle openings disposed in the same plane, parallel to the outer boundary of the retaining element;

FIG. 6, a section taken along the line VI—VI in FIG. 5;

FIG. 7, a longitudinal section through a spray nozzle with an adjustable nozzle opening and with a tubular diaphragm and an inserted connection piece;

DETAILED DESCRIPTION OF THE PREFERRED EMBODIMENTS

A spray nozzle 10 is secured to a pivotable part of a wiper arm, not shown in further detail. The pivotable part will hereinafter be called a retaining element 14, and it can be a fastening part, a hinge part and/or a wiper rod connected to the hinge part, or part of a wiper blade.

Figure 12:
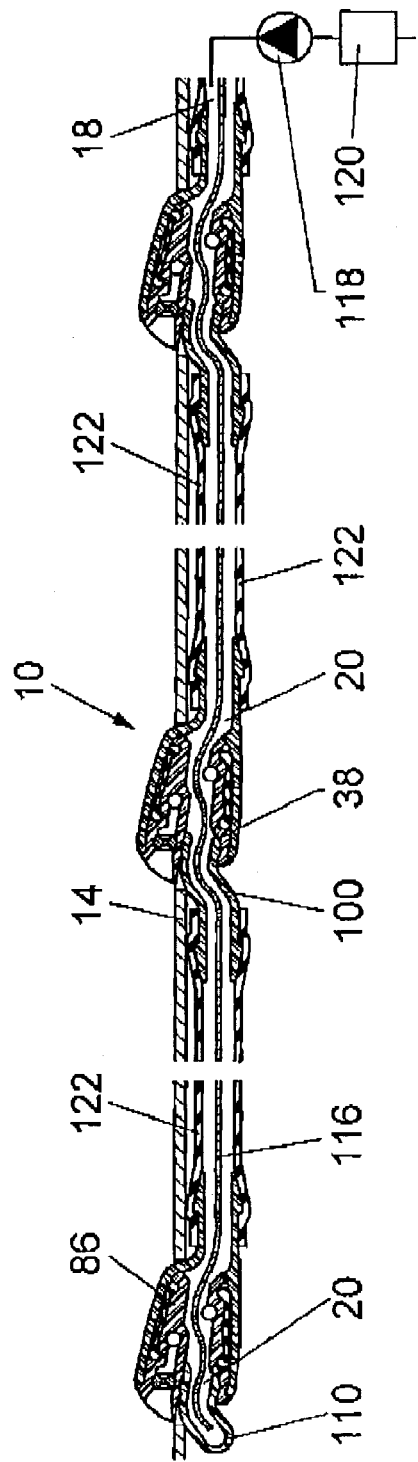
FIG. 12, a longitudinal section through an arrangement with a plurality of spray nozzles.

The spray nozzle 10 comprises a housing 16, which is separably connected by means of a connection piece 32 via a water line 18 to a water pump 118, which from a supply tank 120 pumps washing water to the spray nozzle 10 (FIG. 12). The housing 16 is made from plastic and surrounds a water conduit 20, which is closed on its free end 38 and from which a connecting conduit 22 branches off. The connecting conduit 22 leads to a spray conduit 24 having a nozzle opening 26. The housing 16 is clipped into an opening 34 of the retaining element 14 and is fixed and retained by means of integrally formed lugs 40 and 42. A nozzle body 12 has a stub 30, which surrounds the spray conduit 24 and with which, via a plug connection, it engages an opening 36 of the housing 16. The outer part 44 of the nozzle body 12 has at least one nozzle opening 26 and covers the opening 34 in the retaining element 14. The nozzle body 12 protrudes with the orifice 28 of the spray conduit 24 far enough out of the opening 34 of the retaining element 14 that the inner wall, toward the retaining element 14, of the spray conduit 24 or of the nozzle opening 26 is flush with the outer wall 46 of the retaining element 14.

FIG. 3 schematically shows how the spray nozzle 10 is disposed in the opening 34 of a leg 52 of the retaining element 14. The nozzle opening 26 is located in the upper region 50 of the retaining element 14. In a further variant, the opening 34 extends over part of the leg 52 and of the top wall 54 (FIG. 4). If there are a plurality of nozzle openings 26, they can be disposed vertically one above the other in the upper region 50 (FIGS. 5 and 6). Disposing the nozzle openings 26 in the upper region 50 of the retaining element 14 results in a steep impact angle α of the stream of water, and this has a good cleaning effect. Furthermore, the impact point shifts only slightly as a function of production variations and wear.

Figure 8:
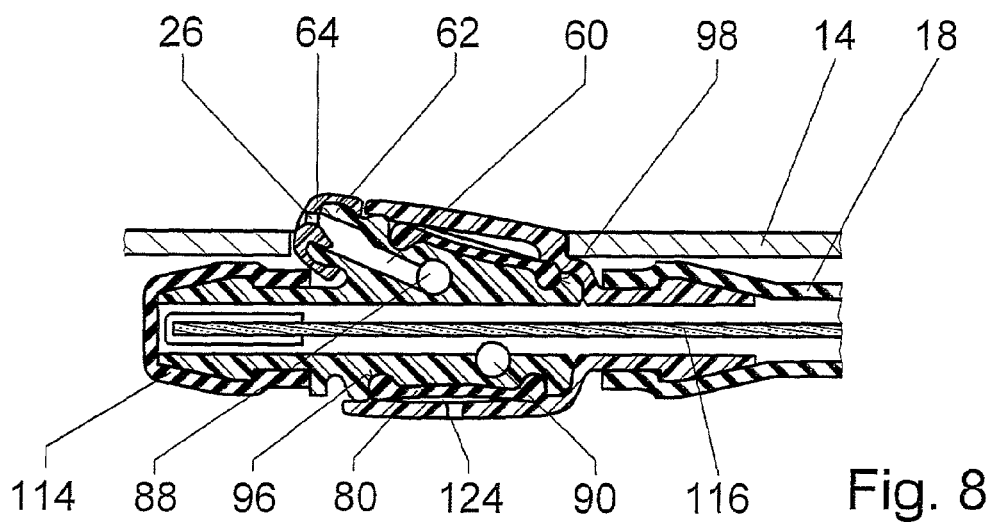
FIG. 8, a longitudinal section through a spray nozzle with a nozzle cap and a tubular diaphragm as well as an end piece slipped onto it.
Figure 9:
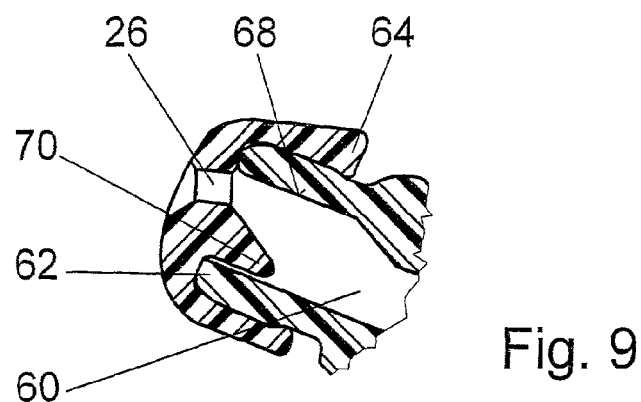
FIGS. 9–10, a longitudinal section through variants of the nozzle cap.

FIG. 1 shows a nozzle opening 26 which is integrated with the nozzle body 12 and does not allow adjusting the spray stream. To enable adjusting the spray stream, a variant provides a ball 48, which has a nozzle opening 26 and is press-fitted into a ball seat 56 of the spray conduit 58 (FIG. 7). A further variant shows a spray conduit 60 in an integrally formed stub 62, on which a nozzle cap 64 that has a nozzle opening 26 is seated (FIG. 8). FIG. 7 shows the nozzle cap 64 enlarged and clipped onto the stub 62. The nozzle opening 26 is disposed in the region of the outer inner wall 68 of the spray conduit 60. The nozzle cap 64, on the side toward the nozzle body 86, also has a guide body 70, which converges on the nozzle opening 26 and engages the widened spray conduit 60. The guide body 70 brings about a streamlined course of the water in front of the nozzle opening 26.

Figure 10:
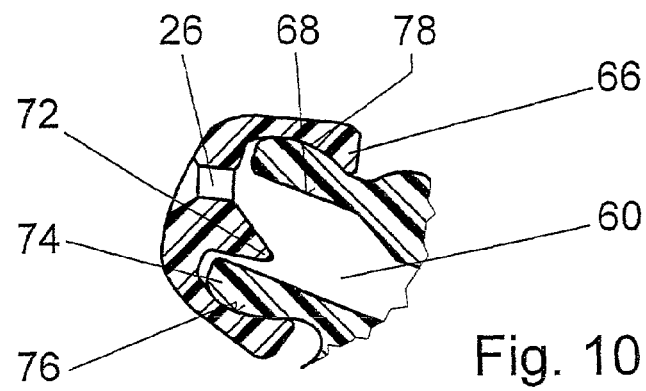

Embodying the nozzle cap 64 in this way does not allow adjusting the nozzle opening 26. To enable making an adjustment, a variant of the invention provides a nozzle cap 66, which with its spherical inside surface 76 is seated on a ball seat 78 of the integrally formed stub 74 (FIG. 10).

Figure 11:
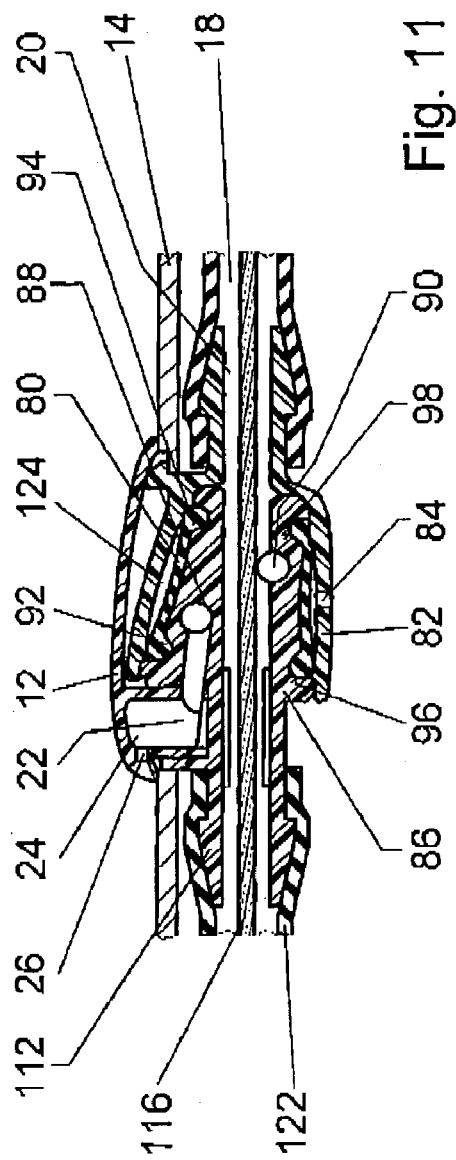
FIG. 11, a variant of FIG. 1, with a tubular diaphragm and a connection piece to a water conduit leading onward.

FIG. 1 shows a simple design of the spray nozzle 10, which has no check valve. FIG. 11 shows a variant of the spray nozzle 10 with a tubular diaphragm 80, which acts as a check valve and is accommodated in an annular chamber 124, and which on its ends having beads 92, 94 sealingly engages annular grooves 96, 98 of the nozzle body 86. By the imposition of a pump pressure, water flows from a water line 18 through a water conduit 20 into the connecting conduit 22, which discharges into the annular chamber 124 inside the tubular diaphragm 80 with a discharge opening 90, and spreads the tubular diaphragm 80 open. The water enters a chamber between the tubular diaphragm 80 and the nozzle body 86 and from there flows into the spray conduit 24, which also has a discharge opening 88 in this chamber, which discharge opening is controlled by the tubular diaphragm 80. When the tubular diaphragm 80 lifts up from the nozzle body 86, after a certain opening travel it presses against the housing 82. This prevents the tubular diaphragm 80 from overstretching at relatively high spray pressures. At least one ventilation bore 84 is provided in the region of the tubular diaphragm 80 in the housing 82, so that the air between the tubular diaphragm 80 and the housing 82 can escape from the annular chamber 124 upon opening. In the closed state, the tubular diaphragm 80 rests with intrinsic tension on the nozzle body 86. It closes the discharge openings 88 and 90 and thus disconnects the water conduit 20 from the spray conduit 24. The tubular diaphragm 80 comprises an elastomer. To lend the tubular diaphragm 80 sufficient clearance for motion without increasing the installation space and without deviating from a regular outer contour, the outer diameter of the nozzle body 86 is decreased in the region between the annular grooves 96 and 98. The mean outer diameter of the nozzle body 86 also increases toward the nozzle opening 26. As a result, both material and weight can be saved, and the available installation space can be optimally utilized.

Windshield wipers with relatively long wiper blades require a plurality of spray nozzles 10. To that end, a variant of the invention provides a water conduit 20, which on its free end 38 has a connection piece 100 to a water line 122 that leads onward. The water line 18 connects all the spray nozzles 10 to one another (FIG. 12). Instead of the connection piece 100, a closure cap 110, which closes the continuous water conduit 20, is clipped into the last spray nozzle 10. To achieve the best possible adaptation of the spray nozzles 10 and the parts of the water line 18 to the respective retaining elements 14, a plurality of variants of connection pieces 100, 112 and closure caps 110, 114 are provided. FIG.

12 shows an offset-bent, inserted connection piece 100 and an offset-bent, inserted closure cap 110. FIG. 11 shows a straight, integrally formed connection piece 112, and FIG. 8 shows a straight closure cap 114 that is slipped on. The entire system, comprising the connecting water line 112 and the spray nozzles 10, can thus be adapted optimally by means of a suitable selection of component parts.

A heating line 116 leads through the water lines 18, 122 and the water conduits 20 of the spray nozzles 10. The nozzle body 86, which is expediently embodied in one piece, is produced as a plastic injection-molded part. As a result, the water in the nozzle body 86 is thermally insulated, so that even at low temperatures only a slight heating output is necessary. This kind of internal heating and a favorable selection of the materials used for the component parts employed result in a small structural volume and economies in terms of energy and expense.

The invention claimed is:

1. A windshield wiper having a wiper arm, which is driven via a drive shaft and to which a wiper blade is pivotably connected, in which at least one spray nozzle (10) is disposed on a pivotable part formed as a retaining element (14), the spray nozzle being composed of a plurality of parts including a housing and nozzle body, the housing (16) of the spray nozzle communicating disconnectably via a water line (18) to a water pump (118), characterized in that in the housings (16) or in the nozzle body (12) communicating with it, a continuous water conduit (20) connected to the water line (18) is provided, from which a connecting conduit (22) branches off that leads to a spray conduit (24) that is approximately parallel to the water conduit (20) and has a nozzle opening (26), the water conduit (20) having a free end (38), and an outer part (44) of the nozzle body (12) has the nozzle opening (26) and covers an opening (34) of the retaining element (14), wherein a connection piece (100) connects the water conduit (20) to an onward-leading water line (122) or a closure cap (110) is provided on the free end (38) of the water conduit (20).

2. The windshield wiper of claim 1, wherein the connection piece (100) is offset-bent.

3. The windshield wiper of claim 1, wherein the nozzle body (12) with an orifice (28) of the spray conduit (24) protrudes in such a way from the opening (34) of the retaining element (11) that the inner wall of the spray conduit (24) or of the nozzle opening (26) toward the retaining element (14), is flush with and outer wall (46) of the retaining element (14).

4. The windshield wiper of claim 1, wherein the nozzle opening (26) is disposed in an upper region (50) of the retaining element (14), wherein the retaining element (14) has a U-shaped cross-sectional profile, and the opening (34) of the retaining element extends across a part of a leg (52) and a top wall (54).

5. The windshield wiper of claim 1, wherein a plurality of nozzle openings (26) are disposed vertically one above the other relative to the windshield.

6. The windshield wiper of claim 1, wherein a ball (48) is press-fitted with the nozzle opening (26) into a ball seat (56) of the spray conduit (58).

7. The windshield wiper of claim 1, wherein an orifice of the spray conduit (60) is formed by a stub (62) integrally formed onto the nozzle body (12), onto which stub a nozzle cap (64) that has the nozzle opening (26) is placed.

8. The windshield wiper of claim 7, wherein the nozzle cap (66) is of plastic and is clipped onto a ball seat (78) of the stub (74).

9. The windshield wiper of claim 7, wherein the nozzle opening (26) is disposed in a region of an outer inner wall (68) of the orifice of the spray conduit (60).

10. The windshield wiper of claim 9, wherein the nozzle cap (64, 66), with a guide body (70, 72) that converges on the nozzle opening (26), engages a widening of the spray conduit (60) on the side of the nozzle cap toward the nozzle body (12).

11. The windshield wiper of claim 1, wherein the connecting conduit (22) and the spray conduit (24) discharge into an annular chamber on the circumference of the nozzle body, and their discharge openings (88, 90) are covered by a diaphragm (80).

12. The windshield wiper of claim 11, wherein the diaphragm is a rubber-elastic tubular diaphragm (80) and has beads (92, 94) on its ends that are embedded in annular grooves (96, 98) of the nozzle body (86).

13. The windshield wiper of claim 12, wherein the outer diameter of the nozzle body (86) decreases in the region between the annular grooves (96, 98).

14. The windshield wiper of claim 12, wherein the outside diameter of the nozzle body (86) tapers conically toward the water line (18).

15. The windshield wiper of claim 11, wherein a ventilation bore (84) is provided on the circumference of the tubular diaphragm (80) in the housing (82).

16. The windshield wiper of claim 15, wherein the tubular diaphragm (80), after a predetermined opening stroke, is braced on a wall of the housing (82).

17. The windshield wiper of claim 1, wherein the housing (16) is retained in the opening (34) of the retaining element (14), and the nozzle body (12) has a stub (30) surrounding the connecting conduit (22), with which stub, via a plug connection, it engages the inside of an opening (36) of the housing (16).

* * * * *